US008769131B2

(12) United States Patent
Pomerantz et al.

(10) Patent No.: US 8,769,131 B2
(45) Date of Patent: Jul. 1, 2014

(54) CLOUD CONNECTOR KEY (75) Inventors: Omer Pomerantz, Herzlia (IL); Jeremy Hoyland, Bet Shemesh (IL); Daniel David Blaukopf, Raanana (IL)

(73) Assignee: Oracle America, Inc., Redwood City, CA (US)

( * ) Notice: Subject to any disclaimer, the term of this patent is extended or adjusted under 35 U.S.C. 154(b) by 415 days.

(21) Appl. No.: 12/761,922

(22) Filed: Apr. 16, 2010

(65) Prior Publication Data
US 2011/0258333 A1 Oct. 20, 2011

(51) Int. Cl.
G06F 15/16 (2006.01)
H04L 29/06 (2006.01)
G06F 17/30 (2006.01)

(52) U.S. Cl.
CPC ............ *H04L 63/08* (2013.01); *H04L 63/0428* (2013.01); *G06F 17/30* (2013.01); *G06F 17/3089* (2013.01); *G06F 17/30893* (2013.01); *G06F 17/30896* (2013.01); *G06F 17/30861* (2013.01); *G06F 17/30876* (2013.01); *H04L 63/04* (2013.01); *H04L 63/06* (2013.01); *H04L 63/20* (2013.01); *H04L 63/10* (2013.01); *H04L 63/18* (2013.01)
USPC ........... 709/229; 709/203; 709/204; 709/206; 709/216; 709/217; 709/219; 709/222; 709/223; 709/224; 709/225; 709/226; 709/227; 726/1; 726/3; 726/4; 726/5; 726/6; 726/9; 726/10; 726/12; 726/17; 726/19; 370/328; 370/331; 725/25; 717/101; 717/102; 717/103; 717/120; 717/171; 717/172; 717/173; 717/174; 717/175; 717/176; 717/177; 717/178

(58) Field of Classification Search
CPC ..... H04L 63/00; H04L 63/02; H04L 63/0281; H04L 63/04; H04L 63/0428; H04L 63/06; H04L 63/061; H04L 63/062; H04L 63/067; H04L 63/068; H04L 63/08; H04L 63/10; H04L 63/102; H04L 63/18; H04L 63/20; H04L 67/00; H04L 67/34; H04L 67/42; H04L 41/00
USPC ......... 709/206, 207, 216, 219, 220, 221, 224, 709/225, 226, 228, 229, 230, 203, 204, 217, 709/222, 223, 227; 455/412.1, 414.1; 705/10, 400; 718/1, 104, 105, 107, 718/108; 726/1, 7, 3, 4, 5, 6, 9, 10, 12, 17, 726/19; 719/328; 717/176, 177, 178, 101, 717/102, 103, 120, 171, 172, 173, 174, 717/175; 715/733, 740, 714, 742, 743, 748; 713/189, 190, 193, 375; 707/E17.001–E17.009, E17.01, 707/E17.014, E17.32, E17.044, E17.045, 707/E17.046, 769, 770, 821, 822, 823, 824, 707/825, 826, 827, E17.032, 621, 634, 636, 707/640, 661, 674, 736, 737, 781, 782, 707/783; 370/328, 331; 725/25
IPC ................. H04L 63/00, 63/02, 63/0281, 63/04, H04L 63/0428, 63/06, 63/061, 63/062, 63/067, H04L 63/068, 63/08, 63/10, 63/102, 63/18, H04L 63/20, 67/00, 67/34, 67/42, 41/00, H04L 41/02, 41/04, 41/08, 41/0803, 41/085, H04L 41/0866, 41/20, 41/22, 41/24, 41/50; G06F 17/00, 17/30, 17/30002, 17/30011, G06F 17/30017, 17/30058, 17/30067, 17/30115, G06F 17/30129, 17/30861, 17/30876, 17/3089, G06F 17/30893, 17/30896
See application file for complete search history.

(56) References Cited

U.S. PATENT DOCUMENTS

| 6,633,910 | B1 * | 10/2003 | Rajan et al. ............... 709/224 |
|---|---|---|---|
| 7,277,946 | B2 * | 10/2007 | Humphrey et al. ........... 709/226 |
| 7,970,923 | B2 * | 6/2011 | Pedersen et al. ............. 709/231 |
| 8,117,317 | B2 * | 2/2012 | Klimentiev et al. .......... 709/227 |
| 2004/0078464 | A1 * | 4/2004 | Rajan et al. ............... 709/224 |
| 2007/0083620 | A1 * | 4/2007 | Pedersen ................... 709/219 |
| 2008/0005168 | A1 * | 1/2008 | Huff et al. .................. 707/104.1 |
| 2008/0082601 | A1 * | 4/2008 | Meijer et al. ............... 709/203 |
| 2009/0249439 | A1 * | 10/2009 | Olden et al. ................ 726/1 |

| | | | |
|---|---|---|---|
| 2009/0249440 A1* | 10/2009 | Platt et al. | 726/1 |
| 2009/0276771 A1* | 11/2009 | Nickolov et al. | 717/177 |
| 2010/0061250 A1* | 3/2010 | Nugent | 370/242 |
| 2010/0088150 A1* | 4/2010 | Mazhar et al. | 705/10 |
| 2010/0169497 A1* | 7/2010 | Klimentiev et al. | 709/228 |
| 2010/0250497 A1* | 9/2010 | Redlich et al. | 707/661 |
| 2010/0266132 A1* | 10/2010 | Bablani et al. | 380/286 |
| 2010/0274772 A1* | 10/2010 | Samuels | 707/693 |
| 2010/0332454 A1* | 12/2010 | Prahlad et al. | 707/654 |
| 2010/0332456 A1* | 12/2010 | Prahlad et al. | 707/664 |
| 2010/0332479 A1* | 12/2010 | Prahlad et al. | 707/741 |
| 2010/0332818 A1* | 12/2010 | Prahlad et al. | 713/150 |
| 2010/0333116 A1* | 12/2010 | Prahlad et al. | 719/328 |
| 2011/0022642 A1* | 1/2011 | deMilo et al. | 707/805 |
| 2011/0047463 A1* | 2/2011 | Shepherd et al. | 715/723 |
| 2011/0047540 A1* | 2/2011 | Williams et al. | 717/178 |
| 2011/0055385 A1* | 3/2011 | Tung et al. | 709/224 |
| 2011/0055399 A1* | 3/2011 | Tung et al. | 709/226 |
| 2011/0055712 A1* | 3/2011 | Tung et al. | 715/738 |
| 2011/0093710 A1* | 4/2011 | Galvin et al. | 713/169 |
| 2011/0093941 A1* | 4/2011 | Liu et al. | 726/7 |
| 2011/0099146 A1* | 4/2011 | Mcalister et al. | 707/634 |
| 2011/0099233 A1* | 4/2011 | Calder et al. | 709/206 |
| 2011/0099616 A1* | 4/2011 | Mazur et al. | 726/7 |
| 2011/0145392 A1* | 6/2011 | Dawson et al. | 709/224 |
| 2011/0145439 A1* | 6/2011 | Chaturvedi et al. | 709/244 |
| 2011/0149086 A1* | 6/2011 | Winbush, III | 348/207.1 |
| 2011/0151837 A1* | 6/2011 | Winbush, III | 455/412.1 |
| 2011/0153727 A1* | 6/2011 | Li | 709/203 |
| 2011/0154212 A1* | 6/2011 | Gharpure et al. | 715/738 |
| 2011/0206200 A1* | 8/2011 | Sovio et al. | 380/30 |
| 2011/0209064 A1* | 8/2011 | Jorgensen et al. | 715/733 |
| 2011/0231670 A1* | 9/2011 | Shevchenko et al. | 713/189 |
| 2011/0235799 A1* | 9/2011 | Sovio et al. | 380/30 |
| 2011/0238985 A1* | 9/2011 | Sovio et al. | 713/168 |
| 2011/0246427 A1* | 10/2011 | Modak et al. | 707/653 |
| 2011/0251937 A1* | 10/2011 | Falk et al. | 705/34 |

* cited by examiner

*Primary Examiner* — Saket K Daftuar (74) *Attorney, Agent, or Firm* — Osha Liang LLP (57) ABSTRACT

A cloud connector key includes a network interface configured to connect to a network, a mass storage interface configured to connect to a network isolated device, and a computation module operatively connected to the network interface and the mass storage interface. The computational module is configured to connect to a cloud repository using the network interface by obtaining, from storage on the cloud connector key, a network address of the cloud repository, requesting connection to the cloud repository using the network address, and authenticating, using credentials in the storage on the cloud connector key, to an account in the cloud repository. The computational module is further configured to transfer a file between the account in the cloud repository and a network isolated device via the mass storage interface.

18 Claims, 5 Drawing Sheets

CLOUD CONNECTOR KEY

BACKGROUND

Electronic devices pervade almost every aspect of people's lives. For example, a person may awaken to the sound of an alarm clock, listen to music while getting dressed, go to work listening to the car radio, use a computer at work, and so forth. When the person returns home, they may watch television before returning to bed. When the person is on vacation, they may use a global positioning system to navigate unfamiliar cities, a camera to take pictures, a translator device to translate to different languages, and use other electronic devices.

With the use of electronic devices, network connectivity has also increased. For example, the user may check e-mail on the way to work using a smart phone, store data files remotely using the user's computer, and listen to music stored remotely on the user's network enabled MP3 player. Certain devices, however, cannot be connected to the network. For example, typical digital video disk (DVD) players are not configured to access the network and obtain data files from the network. Rather, these devices only obtain files from local storage on removable storage disks.

SUMMARY

In general, in one aspect, the invention relates to a cloud connector key. The cloud connector key includes a network interface configured to connect to a network, a mass storage interface configured to connect to a network isolated device, and a computation module operatively connected to the network interface and the mass storage interface. The computational module is configured to connect to a cloud repository using the network interface by obtaining, from storage on the cloud connector key, a network address of the cloud repository, requesting connection to the cloud repository using the network address, and authenticating, using credentials in the storage on the cloud connector key, to an account in the cloud repository. The computational module is further configured to obtain a file from the account in the cloud repository and provide the file to the network isolated device via the mass storage interface.

In general, in one aspect, the invention relates to a cloud connector key that includes a network interface configured to connect to a network, a mass storage interface configured to connect to a network isolated device, a computation module operatively connected to the network interface and the mass storage interface. The computational module is configured to obtain a file from the network isolated device via the mass storage interface and connect to a cloud repository using the network interface by obtaining, from storage on the cloud connector key, a network address of the cloud repository, requesting connection to the cloud repository using the network address, and authenticating, using credentials in the storage on the cloud connector key, to an account in the cloud repository. The computational module is further configured to transfer the file to the account in the cloud repository.

In general, in one aspect, the invention relates to a computer readable medium that includes computer readable program code embodied therein for causing a cloud connector key to perform a method for connecting a network isolated device to an account via a network. The method includes connecting to a cloud repository using a network interface by obtaining, from storage on the cloud connector key, a network address of the cloud repository, requesting connection to the cloud repository using the network address, and authenticating, using credentials in the storage on the cloud connector key, to an account in the cloud repository. The method further includes obtaining a file from the account in the cloud repository and providing the file to a network isolated device via a mass storage interface.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for connecting a network isolated device to a user's account on a cloud. Specifically, embodiments of the invention use a cloud connector key that connects via a mass storage interface to the network isolated device. To the network isolated device, files accessed through the cloud connector key appears as local storage. However, the cloud connector key transparently manages the connection to the user's account in the cloud. Specifically, transparently to the network isolated device, the cloud connector key obtains a network address of the repository containing the user's account, requests the connection, and transfers files between the network isolated device and the user's account in accordance with one or more embodiments of the invention.

Figure 1:
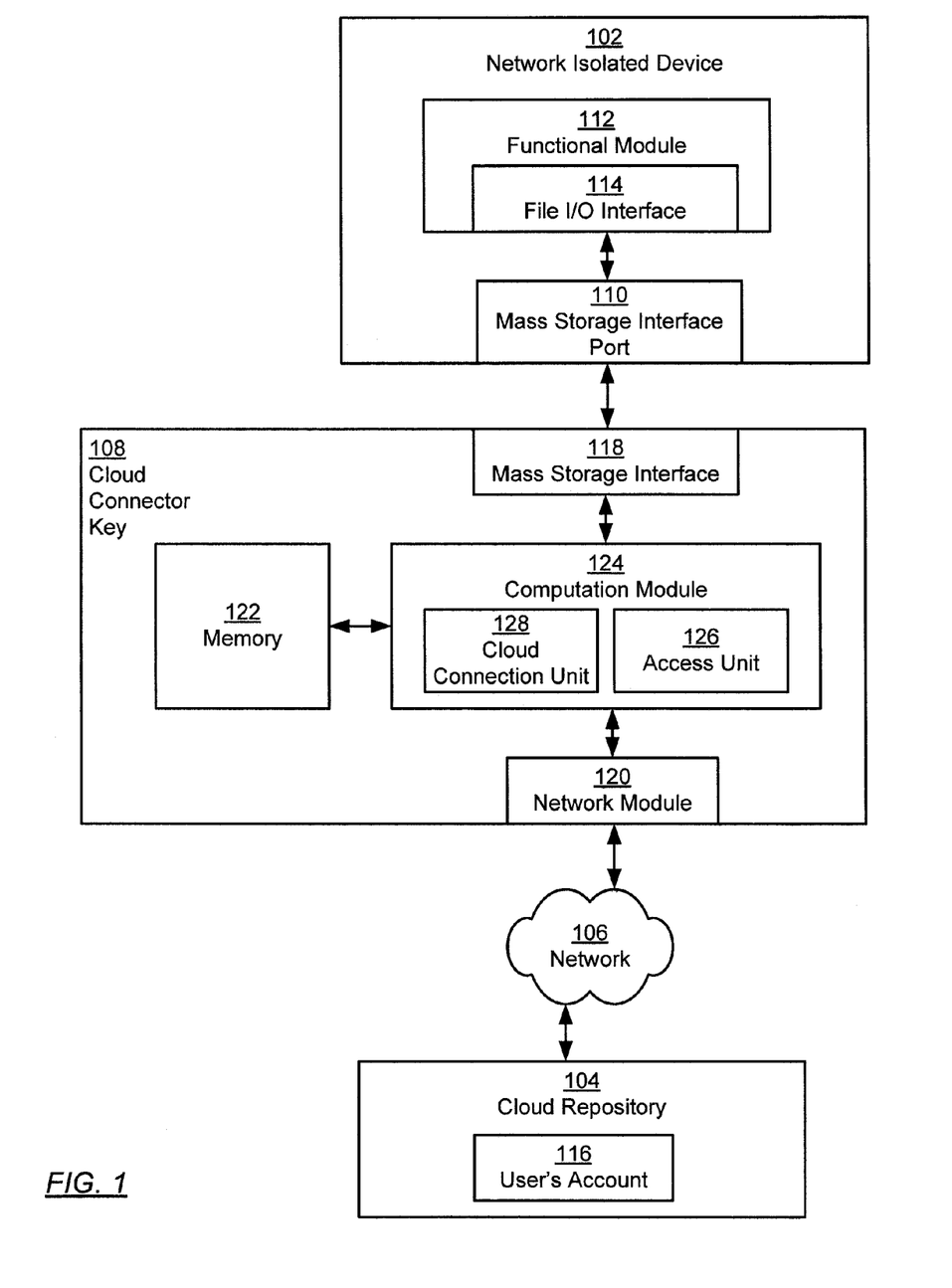
FIG. 1 shows a schematic diagram of a system in accordance with one or more embodiments of the invention.

FIG. 1 shows a schematic diagram of a system in accordance with one or more embodiments of the invention. As shown in FIG. 1, the system includes a network isolated device (102), a cloud repository (104), a network (106), and a cloud connector key (108). Each of these components is described below.

A network isolated device (102) corresponds to a device that cannot natively access the network (106). Specifically, the network isolated device does not natively include the functionality to independently access the network (106). More specifically, the necessary firmware or software (e.g., protocol support layers, addressing, etc.) to communicate with the network (106) does not execute and/or cannot be loaded onto the network isolated device (102). In addition, the network isolated device (102) may not include any interface capable of directly connecting to the network. In one or more embodiments of the invention, the network isolated device is dedicated to performing a task. For example, the network isolated device may be configured to perform one or more of the following tasks: capture audio/video, capture images, present a book, play music, play movies, etc. For example, the network isolated device (102) may correspond to a car radio, a portable electronic book reader, a mobile MP3 player, a digital video disk (DVD) player, a television, a non-network enabled digital camera, or other device.

In one or more embodiments of the invention, the network isolated device (102) includes a mass storage interface port (110) and a functional module (112). In one or more embodiments of the invention, the mass storage interface port (110) is a hardware port for connecting to a storage device (i.e., a device for storing data). For example, the mass storage interface port may correspond to a Bluetooth port, a universal serial bus (USB) port, a memory card port (e.g., a port for interfacing with Compact Flash (CF) cards, Secure Digital (SD) cards, Multimedia Card (MMC) cards, memory sticks, etc.).

In one or more embodiments of the invention, the functional module (112) includes functionality to perform the task(s) of the network isolated device (102). In one or more embodiments of the invention, the functional module (112) includes functionality to perform at least one or more of the following: decode incoming files into a format that can be presented to a user of the functional module (112) and encode data into a file format suitable for storage. The functional module (112) may correspond to hardware, software, firmware, or a combination thereof. For example, the functional module may include a processor, memory (e.g., cache memory, register level memory, etc.), and instructions. For example, if the network isolated device (102) is a digital camera, the functional module (112) includes functionality to capture and display digital images using stored digital image files.

The functional module (112) implements a file input/output (I/O) interface (114). The file I/O interface (114) is configured to use file system request received from the functional module to access local storage (i.e., a storage device directly connected to the network isolated device). For example, the file I/O interface (114) may include the ability to translate the data format of the file system request to open a file, identify the files on the local storage device, delete a file, move a file, close a file, retrieve a file, and other file system requests into a data format for communication with a local storage device.

Continuing with FIG. 1, in one or more embodiments of the invention, the cloud repository (104) is any type of remotely accessible storage unit and/or device (e.g., a file system, database, collection of tables, or any other storage mechanism) for storing data. Specifically, the cloud repository (104) includes software and/or hardware for storage, access, and retrieval of data. In one or more embodiments of the invention, the cloud repository (104) is geographically remote (e.g., different room, building, city, state, and/or country) from the network isolated device (102). Further, the cloud repository (104) may include multiple different storage units and/or devices. For example, the cloud repository (104) may include an identity server for managing user identities and authenticating users, an application server, and a database server. The multiple different storage units and/or devices may or may not be of the same type or located at the same physical site. For example, a portion of the cloud repository (104) may be located in Arizona while another portion is located in London, England.

In one or more embodiments of the invention, the cloud repository (104) includes one or more users' accounts (116). Each account (116) provides an association between user identity information and files that the user (once identified) may access. The user identity information may include authentication information, authorization information, and other administrative information for the user. For example, the authentication information includes credentials for the user to verify the identity of the user. The credentials may include, for example, username and password, an authentication code known only to the cloud repository (104) and the devices the user authorized, or other information for ensuring the identity of the user. Authorization information defines the files in the cloud repository (104) that the user has permission to access. For example, the authorization information may specify that the user only has permission to access files in the account associated with the user. Alternatively or additionally, the authorization information may specify that the user has permission to access files associated with a group of which the user is a member. The authentication information may also specify the type of access that the user may perform for each file. For example, the authentication information may specify whether the user can read, write, execute, copy, and/or delete the file. The other administrative information may include contact information for the user.

In one or more embodiments of the invention, the files in the account (116) may correspond to any type of file having data. For example, the files may include media files, application files, and other types of data files. Media files may include music files, video files, pictures, text files, sound recorded files, and other such files. In one or more embodiments of the invention, each file in the account (116) has a corresponding file format. The file format specifies the encoding of bits in the file (e.g., the meaning of each bit and the ordering of bits). In one or more embodiments of the invention, the file format may be defined by an extension stored in metadata for the file. In one or more embodiments of the invention, an optional file extension is associated with the file. The file extension specifies the file format of the file. Files in the account (116) may be grouped. The grouping may be based on the type of file, the file format, classes of devices that support the file, or other grouping. Different mechanisms may be used to designate a file as a member of the group. For example, all members in a group may be located in the same directory that exclusively includes the members, be associated in metadata with the same identifier, and/or have the same extension.

Continuing with FIG. 1, the cloud repository (104) is connected to the network (106). The network (106) is an interconnection of network enabled computer systems and devices. For example, the network may correspond to a local area network (LAN), a wide area network (WAN) (e.g., the Internet, a mobile network, etc.), any other type of network, or any combination thereof.

In one or more embodiments of the invention, a cloud connector key (108) is interposed between the network (106) and the network isolated device (102). In one or more embodiments of the invention, the cloud connector key (108) is a hardware device configured to access the account, obtain files from the cloud repository, and store files to the cloud repository transparently to the network isolated device. Specifically, the cloud connector key (108) manages the connection with the cloud repository and provides the network isolated device (102) with access to the files in the account as if the files are stored on the cloud connector key (108). The cloud connector key (108) may be implemented in conjunction with a local storage device. For example, the cloud connector key (108) may be a USB dongle, a memory card, a Bluetooth device.

In one or more embodiments of the invention, a user may connect the cloud connector key (108) to the network isolated device (102) in a similar manner to connecting a local storage device. Specifically, the cloud connector key (108) is physically in the dimensions of the local storage device connected to the network isolated device (102). Thus, the cloud connector key (108) fits within the size constraints of the mass storage interface port and corresponding slot of the network isolated device (102).

In one or more embodiments of the invention, a software-based user interface cannot be displayed on the cloud connector key (108). For example, the cloud connection key may have embedded software for use with a computer system and one or more indicator lights, and lack a display screen to display a user interface. In alternative embodiments of the invention, the cloud connector key provides a full user interface to allow the user, using only the cloud connector key, to configure the cloud connector key to access the user's account. In one or more embodiments of the invention, the cloud connector key (108) includes a mass storage interface (118), a network module (120), memory (122), and a computational module (124). Each of these components is described below.

As discussed above, a mass storage interface (118) is a hardware connector on the cloud connector key (108) that connects to the mass storage interface port (110) on the network isolated device (102). In one or more embodiments of the invention, the type of mass storage interface (118) is dependent on the physical form of the cloud connector key (108). For example, the mass storage interface may correspond to a USB plug if the cloud connector key is a USB dongle. As another example, if the physical form of the cloud connector key replicates a memory card, then the mass storage interface includes the typical connections for a memory card.

In one or more embodiments of the invention, the network module (120) includes the hardware for connecting to the network (106). For example, the network module (120) may include a wireless network interface (e.g., an antenna and requisite hardware to send and receive wireless signals) or a wired interface (e.g., network cable port).

In one or more embodiments of the invention, the memory (122) corresponds to a device that includes functionality to store information for the cloud connector key (108). For example, the memory may correspond to flash memory, random access memory, read only memory, and/or other types of hardware storage units. In one or more embodiments of the invention, the data stored in memory may include a network address of the cloud repository (104), user's credentials, location information, and other data.

In one or more embodiments of the invention, the network address uniquely identifies the cloud repository (104) via the network (106). For example, the network address may correspond to an internet protocol address, a media access control address, domain name, another type of address, or any combination thereof.

In one or more embodiments of the invention, the user's credentials include the authentication information by which the user is authenticated to the user's account. For example, the user's credentials may correspond to a user name and password, another type of authentication credential, or any combination thereof.

In one or more embodiments of the invention, location information identifies the location of files within the user's account. In one or more embodiments of the invention, the location information is specific to the network isolated device (102), the tasks provided by the network isolated device, file formats specific to the cloud connector key, and/or the physical type of the cloud connector key (108). For example, the location information may identify one or more folders in which files usable by the network isolated device are located. As another example, the location information may correspond to an identifier of the cloud connector key. The identifier may be associated by the cloud repository with the location of files or type of files that are associated with are usable by the network isolated device (102).

In one or more embodiments of the invention, other data may include parameters that define user preferences, how to authenticate to the cloud repository (104), encryption algorithms and encryption keys for encrypting and decrypting files sent between the cloud connector key (108) and the cloud repository (104). Other data may further include an application for configuring the cloud connector key (108), device information for the cloud connector key (108), etc.

In one or more embodiments of the invention, the memory (122) includes a caching module (not shown). The caching module may include temporary, permanent, semi-permanent storage of files accessed from the cloud repository (104). The caching module may include functionality to provide persistent storage. Specifically, the files may be available on the caching module after the caching module loses power, such as after the cloud connector key (108) is removed from the network isolated device (102). For example, a file from the cloud repository (104) may be stored in the caching module when the cloud connector key (108) is first connected to the network isolated device (102). Continuing with the example, the cloud connector key (108) may be disconnected from the network isolated device (102) and then reconnected to the network isolated device (102). In the example, if the caching module provides persistent storage, the file may be accessed from the caching module after reconnection without accessing the cloud repository (104). Alternatively or additionally, the caching module may include transient storage in accordance with one or more embodiments of the invention. In such embodiments, when power is no longer provided to the caching module, the files in the transient storage of the caching module are destroyed.

In one or more embodiments of the invention, a computational module (124) is interposed between the mass storage interface (118) and the network module (120). The computational module (124) is a logical unit configured to manage access the cloud repository (104) via the network (106) and obtain and store files from and to the cloud repository (104). Further, the computational module (124) is configured to receive and present the files to the network isolated device (102) as if the files were locally stored in a directory on the cloud connector key (108).

In one or more embodiments of the invention, the computational module (124) may be capable of synchronizing stored files in persistent storage on the caching module of the cloud connector key (108) with files on cloud repository (104) while connected to the network isolated device (102). In one or more embodiments of the invention, the synchronization of files may be a complete synchronization of all files on the cloud repository (104). Alternatively, the synchronization may include synchronizing only files that the cloud connector key (108) is configured to access and provide to the network isolated device (102). Alternatively, the synchronization may include synchronizing only files that were previously accessed from the cloud repository (104) and requested by the network isolated device (102). Alternatively or additionally, the synchronization may include removing files (e.g., marking files as outdated, deleting the files, etc.) from the caching module that are modified or deleted from the cloud repository (104). In one or more embodiments of the invention, the computational module (124) is configurable to provide the desired type of synchronization.

In one or more embodiments of the invention, the computational module (124) includes an access unit (126) and cloud connection unit (128). In one or more embodiments of the invention, the access unit (128) includes functionality to request access to the cloud repository (104) and manage the transmission of data between the cloud repository (104) and the network isolated device. Specifically, the access unit includes functionality to identify the network address from memory (122), use the location information to retrieve and store files in the user's account (116) in the cloud repository (104) (via the cloud connection unit), and manage transmission of files between the cloud connector key (108) and the network isolated device (102). In one or more embodiments of the invention, the access unit (126) may further include functionality to authenticate the user using the user's credentials and/or perform encryption and decryption of files sent between the cloud connector key (108) and the cloud repository (104).

In one or more embodiments of the invention, the cloud connection unit (128) includes functionality to receive, from the access unit (126), requests to send information on the network (106) and transmit the information in the form of packets to the network (106). The cloud connection unit (128) may further include functionality to receive packets from the network and forward information corresponding to the packets to the access unit (126). In one or more embodiments of the invention, the cloud connection unit (128) implements the network stack to receive, transmit, and process packets. In one or more embodiments of the invention, executing the network stack may include performing Transmission Control Protocol and Internet Protocol (TCP/IP) processing. In other embodiments of the invention, data may be transferred between the cloud repository and the cloud connector key using non-packet based communication mechanisms.

Although not shown in FIG. 1, the cloud connector key (108) may include a separate power source than the network isolated device (102). In one or more embodiments of the invention, the cloud connector key (108) uses a power source provided by the network isolated device, such as via the mass storage interface (118). In such embodiments, the cloud connector key (108) may lack a separate power source.

Figure 2:
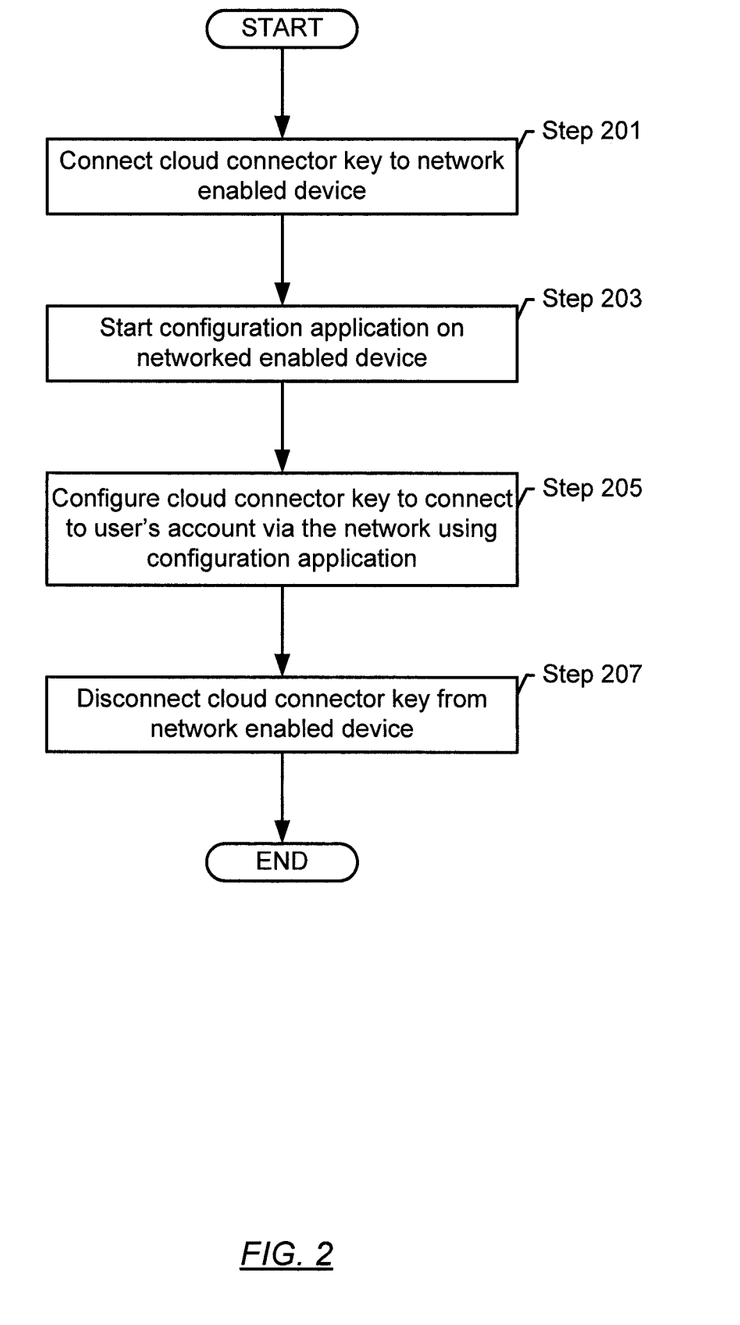
FIGS. 2 and 3 show flowcharts in accordance with one or more embodiments of the invention.
Figure 3:
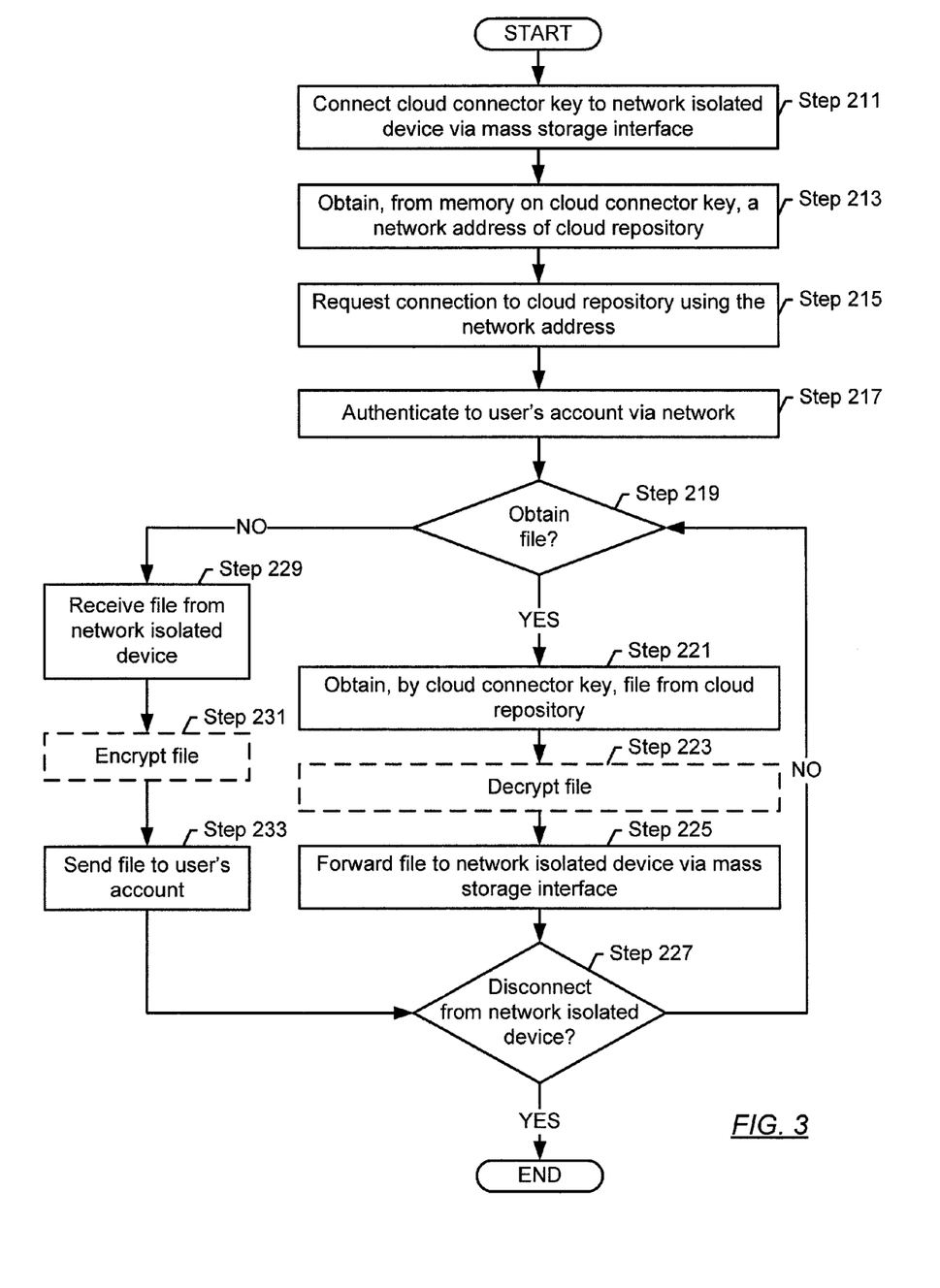

FIGS. 2 and 3 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

FIG. 2 shows a flowchart for configuring the cloud connector key in accordance with one or more embodiments of the invention. In Step 201, the cloud connector key is connected to a network enabled device (e.g., computer, smart phone, or other device capable of accessing a network). Specifically, the cloud connector key is operatively connected to the network enabled device to allow for communication between the network enabled device and the cloud connector key. The connection may be performed using the mass storage interface on the cloud connector key in accordance with one or more embodiments of the invention. In one or more embodiments of the invention, a different interface may be used to connect the cloud connector key to the network isolated device as to the network enabled device. For example, the cloud connector key may be configured to connect to the network isolated device via a USB interface and to the network enabled device via a Bluetooth interface.

Continuing with FIG. 2, in Step 203, the configuration application is started on the network enabled device. Specifically, connecting the cloud connector key may trigger the execution of the configuration application. In one or more embodiments of the invention, the configuration application executes on the processor of the network enabled device and output of the configuration application is displayed on the network enabled device.

In Step 205, the cloud connector key is configured to connect to the user's account via the network using the configuration application. In one or more embodiments of the invention, after the user creates the user's account in the cloud repository, the user submits the user's credentials to the configuration application. Similarly, the user may submit the network address of the cloud repository and location information for files that the cloud connector key is to access (or be able to subsequently access). Rather than the user providing the information, in one or more embodiments of the invention, the configuration application may automatically, without user input obtain configuration parameters from the users account. The configuration application stores the configuration parameters in the memory on the cloud connector key. As another alternative, the network address and the configuration parameters may be pre-stored in memory on the cloud connector key. For example, a business entity that provides the user with the account in the cloud repository may also provide the user with the cloud connector key that is pre-configured to access the account.

In Step 207, the cloud connector key is disconnected from the network enabled device. After the cloud connector key is configured to access the user's account, the user can disconnect the cloud connector key from a network enabled device and connect the cloud connector key to a network isolated device.

FIG. 3 shows a flowchart for using the cloud connector key in accordance with one or more embodiments of the invention. In Step 201, the cloud connector key is connected to a network isolated device via the mass storage interface in accordance with one or more embodiments of the invention.

In Step 213, the cloud connector key obtains, from memory on the cloud connector key, the network address of the cloud. In one or more embodiments of the invention, the access unit obtains the network address from memory. The trigger to obtain the network address may be based, for example, on the cloud connector key detecting that it is connected to a network isolated device, such as by receiving power from the network isolated device. Thus, the network isolated device may remain unaware of and not required to actively command the cloud connector key to connect to the network.

In Step 215, the cloud connector key requests connection to the cloud repository using the network address. Specifically, the cloud connector key connects to the network. Next, while connected to the network, the access unit requests that the cloud connection unit send a request to the cloud repository at the network address.

In Step 217, the cloud connector key authenticates to the user's account in the cloud repository via the network. Specifically, in one or more embodiments of the invention, the cloud repository may respond to the request by requesting user credentials. The data packets containing the request for user credentials may be sent via the network from the cloud connection unit. The cloud connection unit may transfer the packets to the access unit. In turn, the access unit responds with the user's authentication credentials, such as the authentication credentials stored in memory. Thus, in one or more embodiments of the invention, the network isolated device is isolated from any processing involving the network or connecting to a remote account. Specifically, the cloud connector key manages all network processing so that the cloud connector key appears as a local storage device to the network isolated device.

In one or more embodiments of the invention, after the cloud connector key is connected to the network, the cloud connector key may present a file system interface of files on the network to the network isolated device. Specifically, the network isolated device may be able to view and interact with network folders and files using the commands for accessing a local file system interface. More specifically, the cloud connector key generates, from a file system request received by the network isolated device, a network request to send on the network. For example, the network isolated device may request a list of files in a particular folder. Accordingly, the cloud connector key may present the list to the network isolated device, where list of files appears to the network isolated device as files that are stored locally on the network isolated device. Because the cloud connector key performs the network level processing of packets and manages the connection, the existence of the network and the could repository remains hidden to the network isolated device.

In Step 219, a determination is made whether to obtain a file from the user's account. The determination may be made, for example, based on whether the network isolated device sends a file system request to the cloud connector key that include a request for a file. Determining whether to obtain a file from the user's account may further include determining whether the file requested by the network isolated device is located in the caching module of the cloud connector key. If the requested file is stored in the caching module, then the requested file is accessed from the caching module and forwarded to the network isolated device via the mass storage interface (described below and in Step 225). Alternatively, if the requested file is not in the caching module, the determination is made to obtain the requested file from the user's account.

If a determination is made to obtain a file, then the cloud connector key obtains the file from the cloud repository in Step 221. Specifically, the cloud connector key sends a request via the network to the cloud repository. The cloud repository may respond with the file. The file is received via the network module, the cloud connection unit, and the access unit.

In Step 223, the cloud connector key may decrypt the file if the received file is encrypted. Specifically, as part of receiving the file, the access unit may decrypt the file. In one or more embodiments of the invention, the encryption and decryption parameters are obtained from memory on the cloud connector key. Before or after decrypting the file, the received file may be stored in the caching module. Specifically, the received file may be stored in an encrypted or a decrypted format on the cloud connector key. Thus, the received file may be made available for later access by the network isolated device.

In Step 225, the cloud connector key forwards the file to the network isolated device via the mass storage interface. In one or more embodiments of the invention, the file remains encoded as a file when the file is forwarded to the network isolated device. Thus, software, hardware, firmware on the network isolated device decodes the file based on the file format for presentation to the user. Thus, in one or more embodiments of the invention, the file format of the file remains the same from when it is stored at the cloud repository to when it is received by the network isolated device. Likewise, in one or more embodiments of the invention, non-network based metadata remains with the file when the file is forwarded to the network isolated device.

In Step 227, a determination is made whether to disconnect from the network. For example, the cloud connector key may disconnect from the network based on an amount of time that elapsed or lack of power.

Alternatively, in Step 219, if a determination is made to not obtain a file, the determination may be made to send a file to the user's account. In Step 229, the cloud connector key receives a file from the network isolated device. Specifically, the network isolated device may send a storage command to store a file on the cloud connector key. In response, the cloud connector key may prepare the file for transmission to the cloud repository.

In Step 231, the cloud connector key encrypts the file. For example, if the cloud connector key is configured to perform the encryption, then the cloud connector key may encrypt the file using an encryption key stored on the cloud connector key.

In one or more embodiments of the invention, the file from the network isolated device may be stored in the caching module. Specifically, the file may be stored in an encrypted or a decrypted format on the cloud connector key. Thus, the received file may be made available for later access by the network isolated device.

In Step 233, the file is sent to the user's account. Specifically, the access unit of the cloud connector key transmits the request to the cloud connection unit to send the file to the cloud repository. The cloud connection unit divides the file into packets and transmits the packets to the cloud repository via the network. Thus, the cloud connection unit performs the end to end processing of the packets with the cloud repository.

Figure 4:
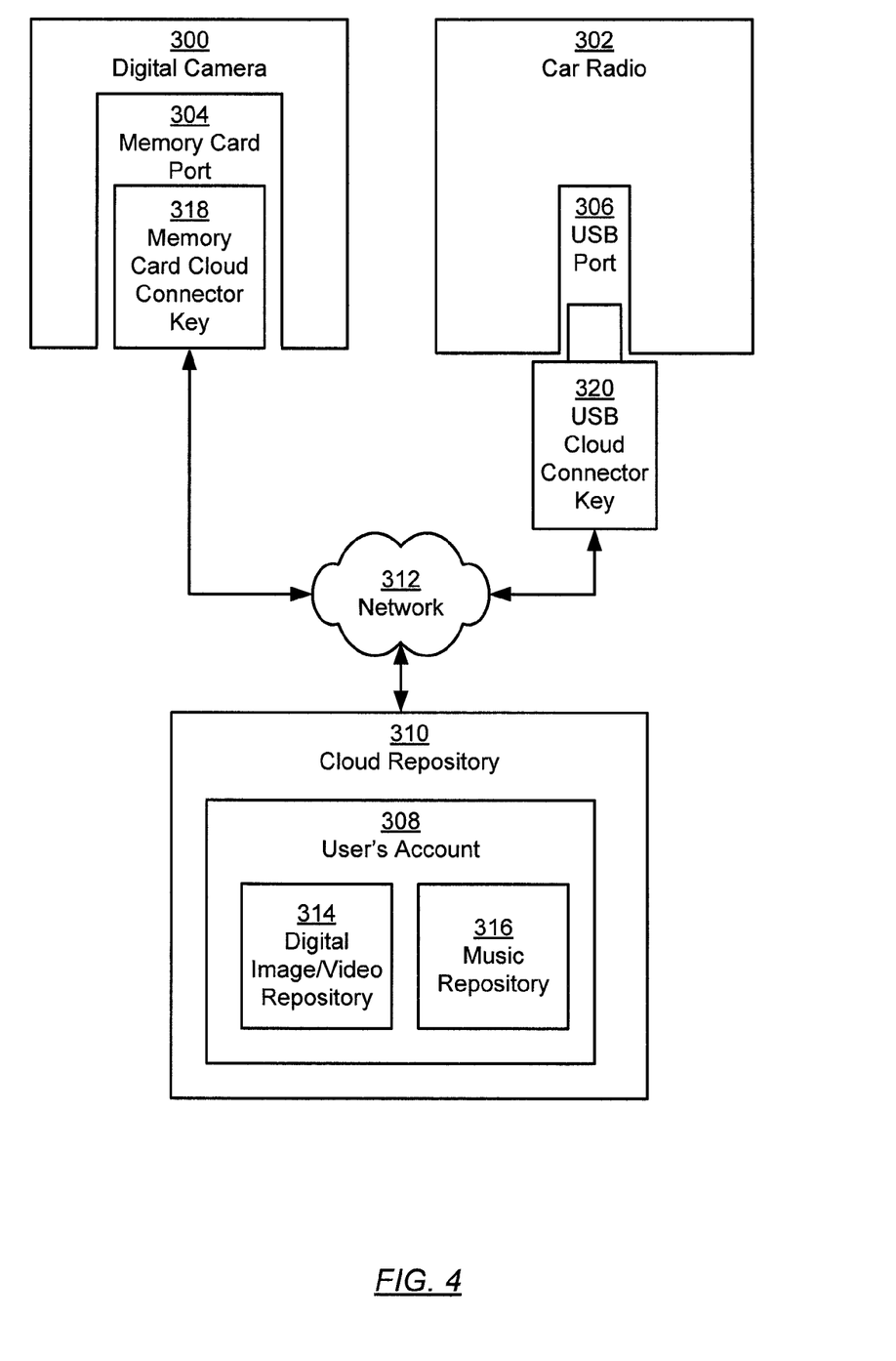
FIG. 4 shows an example in accordance with one or more embodiments of the invention.

FIG. 4 shows an example in accordance with one or more embodiments of the invention. The following example is for explanatory purposes only and not intended to limit the scope of the invention. For the following example, consider the scenario in which John Doe has a digital camera (300) and a car radio (302), each with no functionality to access a network. The digital camera (300) has a memory card port (304) for a memory card. Without the cloud connector key, when the digital camera (300) captures an image, the digital camera (300) simply stores the image locally on a memory card via the memory card port. Thus, the file containing the image is located on the memory card without the cloud connector key.

Similar to the digital camera (300), John Doe's car radio (302) does not have network capabilities. For example, the car radio may only have the capabilities to play music from an antenna to receive radio signals, a compact disc player, and a USB port (306). The car radio (302) may be configured to access a file system located on a USB dongle connected via the USB port (306) in order to play music.

Recognizing that he has many different types of devices to play his media, John Doe creates an account (308) on the cloud repository (310). By creating an account, John Doe can access the cloud repository via the network (312) using various network enabled devices, such as his cell phone (not shown) and/or laptop computer (not shown). After creating the account, John Doe stores videos in a digital image/video repository (314) and music in the music repository (316). John Doe further obtains a memory card cloud connector key (318) and a USB cloud connector key (320).

Using his computer, John Doe configures the memory card cloud connector key (318) to access the digital image/video repository (314). Specifically, in the example, John Doe may connect the memory card cloud connector key (318) to a port on his computer, and use a configuration application on his computer to configure the memory card cloud connector key with the location of the cloud repository, his authentication credentials, and the location of the digital image/video repository (314) within his account (308). For example, John Doe or a configuration application may store on the memory card cloud connector key (318) that the memory card cloud connector key should store and retrieve files from a specific directory having files that are in a format understandable by the digital camera (300). The directory may have only those files or additional files not in a format understandable by the digital camera (300). Alternatively or additionally, John Doe or the configuration application may specify that files having a file extension matching a specific file extension in a list of file extensions corresponds to files understandable by the digital camera (300).

Similarly, John Doe may configure his USB cloud connector key (320) to access his music repository (316). For example, John Doe or a configuration application may store on the USB cloud connector key (320) that files in a specific directory correspond to music or that files having a file extension matching a specific file extension in a list of file extensions corresponds to music.

Next, in the example, consider the scenario in which John Doe takes a road trip in his car and visits various interesting destinations. Because the USB cloud connector key (320) is configured to access John's account (308) on the cloud repository (310), John connects the USB cloud connector key (320) to the USB port (306) on his car radio (302). The USB cloud connector key (320) automatically obtains files from the music repository (316). The car radio (302) views the cloud connector key as a storage device that stores files locally. In other words, the car radio uses file system commands for connecting to a local file system to obtain data from the USB cloud connector key (320). In response, the USB cloud connector key (320) presents the files to the car radio (320) transparently from the network (312). Thus, even though John Doe's car radio (320) is a network isolated device that cannot by itself access or be configured to access the network, John Doe can still listen to music from the music repository (316) via the account.

Continuing with the example, consider the scenario in which John Doe pauses on the road trip to take pictures. John Doe physically connects his memory card cloud connector key (318) to the memory card port on the digital camera (300). Because the memory card cloud connector key (318) is physically in the shape of the memory card, the memory card cloud connector key (318) fits into the memory card slot having the memory card port (304) similar to a standard memory card. To the digital camera (300) the memory card cloud connector key appears like a normal memory card having a file system structure and files stored thereon. Thus, when John Doe takes pictures, the digital camera (300) sends a store command to the memory card cloud connector key (318) to store the new image file. Transparently, to the digital camera (300), the memory card cloud connector key (318) authenticates to John's account and transmits the image file to the digital image/video repository (314) within his account. Therefore, the storage size constraining the number of pictures and/video John Doe can take while on the trip is increased to the maximum amount that John can store in his account.

As shown in the example, using the mass storage interface, the network isolated devices of John Doe's car radio and digital camera can receive files from John's account. The cloud connector key manages the connections and presents files to the network isolated device as if the files were locally stored on the cloud connector key in accordance with one or more embodiments of the invention.

Figure 5:
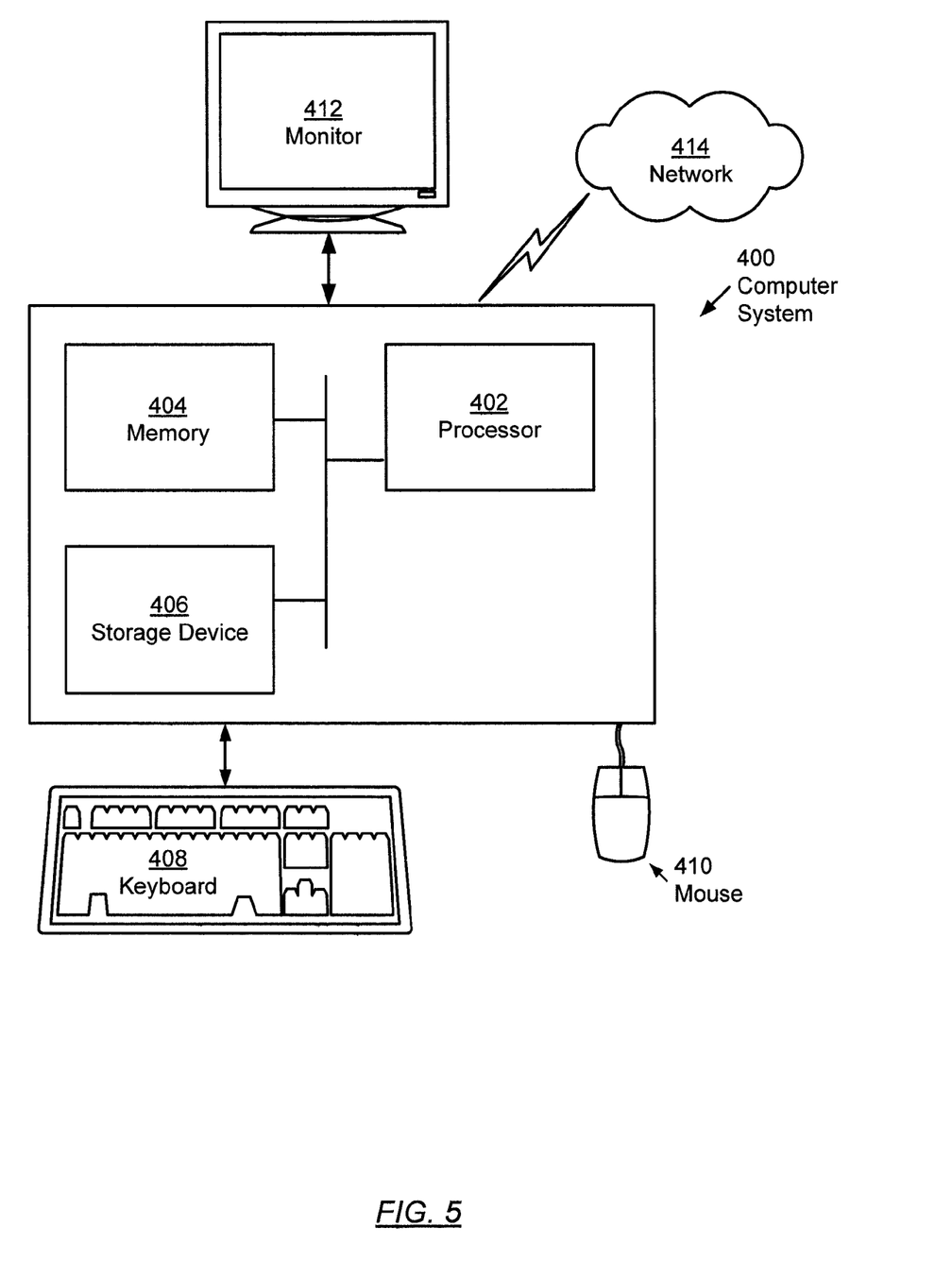
FIG. 5 shows a computer system in accordance with one or more embodiments of the invention.

Embodiments of the invention may be implemented on virtually any type of computer regardless of the platform being used. For example, as shown in FIG. 5, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Computer readable program code to perform embodiments of the invention may be stored on a computer readable medium, such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention. The processor(s) may be located, for example on the cloud connector key.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A hardware cloud connector key comprising:
a memory;
a network interface configured to connect to a network;
a hardware mass storage interface configured to directly connect to a network isolated device, wherein the network isolated device is a separate hardware device from the hardware cloud connector key, wherein the network isolated device is a device lacking a networking capability, wherein the networking capability is any interface capable of directly connecting to the network, and wherein the hardware mass storage interface is a hardware interface coupled to the network isolated device;
a computation module operatively connected to the memory, the network interface and the hardware mass storage interface, and configured to:
connect to a cloud repository using the network interface by:
obtaining, from storage on the hardware cloud connector key, a network address of the cloud repository,
requesting connection to the cloud repository using the network address, and
authenticating, using credentials in the storage on the hardware cloud connector key, to an account in the cloud repository;
receive, via the hardware mass storage interface, a file system request for a file from the network isolated device, wherein the file system request is an open file command for accessing a local file system;
generate a network request for the file based on the file system request;

send the network request to the cloud repository;
obtain a plurality of packets corresponding to the file from the account in the cloud repository based on the network request;
perform, on the plurality of packets, Transmission Control Protocol and Internet Protocol (TCP/IP) processing to obtain the file; and
provide the file to the network isolated device via the hardware mass storage interface.

2. The hardware cloud connector key of claim 1, wherein the computational module is further configured to decrypt the file prior to providing the file to the network isolated device.

3. The hardware cloud connector key of claim 1, wherein the network isolated device is a network isolated digital camera.

4. The hardware cloud connector key of claim 1, wherein the hardware mass storage interface of the hardware cloud connector key is a memory card plug that connects to a memory card port on the network isolated device.

5. The hardware cloud connector key of claim 1, wherein the hardware mass storage interface is a universal serial bus (USB) compliant interface, and wherein the hardware mass storage interface is a USB plug that connects to a USB port on the network isolated device.

6. The hardware cloud connector key of claim 1, wherein the memory comprises a caching module for storing a copy of the file on the hardware cloud connector key.

7. The hardware cloud connector key of claim 6, wherein the computational module is further configured to:
determine that the copy of the file is not stored in the caching module prior to obtaining the file from the account; and
store the copy of the file in the caching module after obtaining the file from the account.

8. A hardware cloud connector key comprising:
a memory;
a network interface configured to connect to a network;
a hardware mass storage interface configured to directly connect to a network isolated device, wherein the network isolated device is a separate hardware device from the hardware cloud connector key, wherein the network isolated device is a device lacking a networking capability, wherein the networking capability is any interface capable of directly connecting to the network, and wherein the mass storage interface is a hardware interface coupled to the network isolated device;
a computation module operatively connected to the memory, the network interface, and the hardware mass storage interface, and configured to:
receive, via the hardware mass storage interface, a file system request from the network isolated device, wherein the file system request is a store file command for accessing a local file system;
obtain, based on the file system request, a file from the network isolated device via the hardware mass storage interface;
connect to a cloud repository using the network interface by:
obtaining, from storage on the hardware cloud connector key, a network address of the cloud repository,
requesting connection to the cloud repository using the network address, and
authenticating, using credentials in the storage on the hardware cloud connector key, to an account in the cloud repository;
generate, in response to the file system request, a network request comprising a plurality of packets corresponding to the file, wherein generating the network request comprises performing Transmission Control Protocol and Internet Protocol (TCP/IP) processing to obtain the plurality of packets; and
transfer the file to the account in the cloud repository by transmitting the plurality of packets to the cloud repository.

9. The hardware cloud connector key of claim 8, wherein the computational module is further configured to encrypt the file prior to providing the file to the network isolated device.

10. The hardware cloud connector key of claim 8, wherein the network isolated device is a network isolated digital camera.

11. The hardware cloud connector key of claim 8, wherein the hardware mass storage interface of the hardware cloud connector key device is a memory card plug that connects to a memory card port on the network isolated device.

12. The hardware cloud connector key of claim 8, wherein the hardware mass storage interface is a universal serial bus (USB) compliant interface, and wherein the hardware mass storage interface is a USB plug that connects to a USB port on the network isolated device.

13. The hardware cloud connector key of claim 1, wherein the memory comprises a caching module for storing a copy of the file on the hardware cloud connector key.

14. A non-transitory computer readable medium comprising computer readable program code embodied therein for causing a cloud connector key to perform a method for connecting a network isolated device to an account via a network, the method comprising:
connecting to a cloud repository using a network interface by:
obtaining, from storage on the cloud connector key, a network address of the cloud repository,
requesting connection to the cloud repository using the network address, and
authenticating, using credentials in the storage on the cloud connector key, to an account in the cloud repository;
receiving, via the mass storage interface, a file system request for a file from the network isolated device, wherein the file system request is an open file command for accessing a local file system, wherein the network isolated device is a device lacking the networking capability, wherein the networking capability is any interface capable of directly connecting to the network, and wherein the mass storage interface is a hardware interface that is coupled to the network isolated device;
generating a network request for the file based on the file system request;
sending the network request to the cloud repository;
obtaining a plurality of packets corresponding to the file from the account in the cloud repository based on the network request;
performing, on the plurality of packets, Transmission Control Protocol and Internet Protocol (TCP/IP) processing to obtain the file; and
providing the file to a network isolated device via a mass storage interface device,
wherein the network isolated device is a separate hardware device from the cloud connector key.

15. The non-transitory computer readable medium of claim 14, wherein the mass storage interface of the cloud connector key device is a memory card plug that connects to a memory card port on the network isolated device.

16. The hardware cloud connector key of claim 1, wherein the hardware mass storage interface is a hardware connector on the cloud connector key that connects to a mass storage interface port on the network isolated device.

17. The hardware cloud connector key of claim 8, wherein the hardware mass storage interface is a hardware connector on the cloud connector key that connects to a mass storage interface port on the network isolated device.

18. The non-transitory computer readable medium of claim 14, wherein the mass storage interface is a hardware connector on the cloud connector key that connects to a mass storage interface port on the network isolated device.

* * * * *

UNITED STATES PATENT AND TRADEMARK OFFICE
CERTIFICATE OF CORRECTION

| | | |
|---|---|---|
| PATENT NO. | : 8,769,131 B2 | Page 1 of 1 |
| APPLICATION NO. | : 12/761922 | |
| DATED | : July 1, 2014 | |
| INVENTOR(S) | : Pomerantz et al. | |

It is certified that error appears in the above-identified patent and that said Letters Patent is hereby corrected as shown below:

Title Page: Item 75, under Inventors, line 1, delete "Herzlia" and insert -- Herzliya --, therefor.

Signed and Sealed this
Twenty-fourth Day of February, 2015

Michelle K. Lee
*Deputy Director of the United States Patent and Trademark Office*